United States Patent Office 2,710,436
Patented June 14, 1955

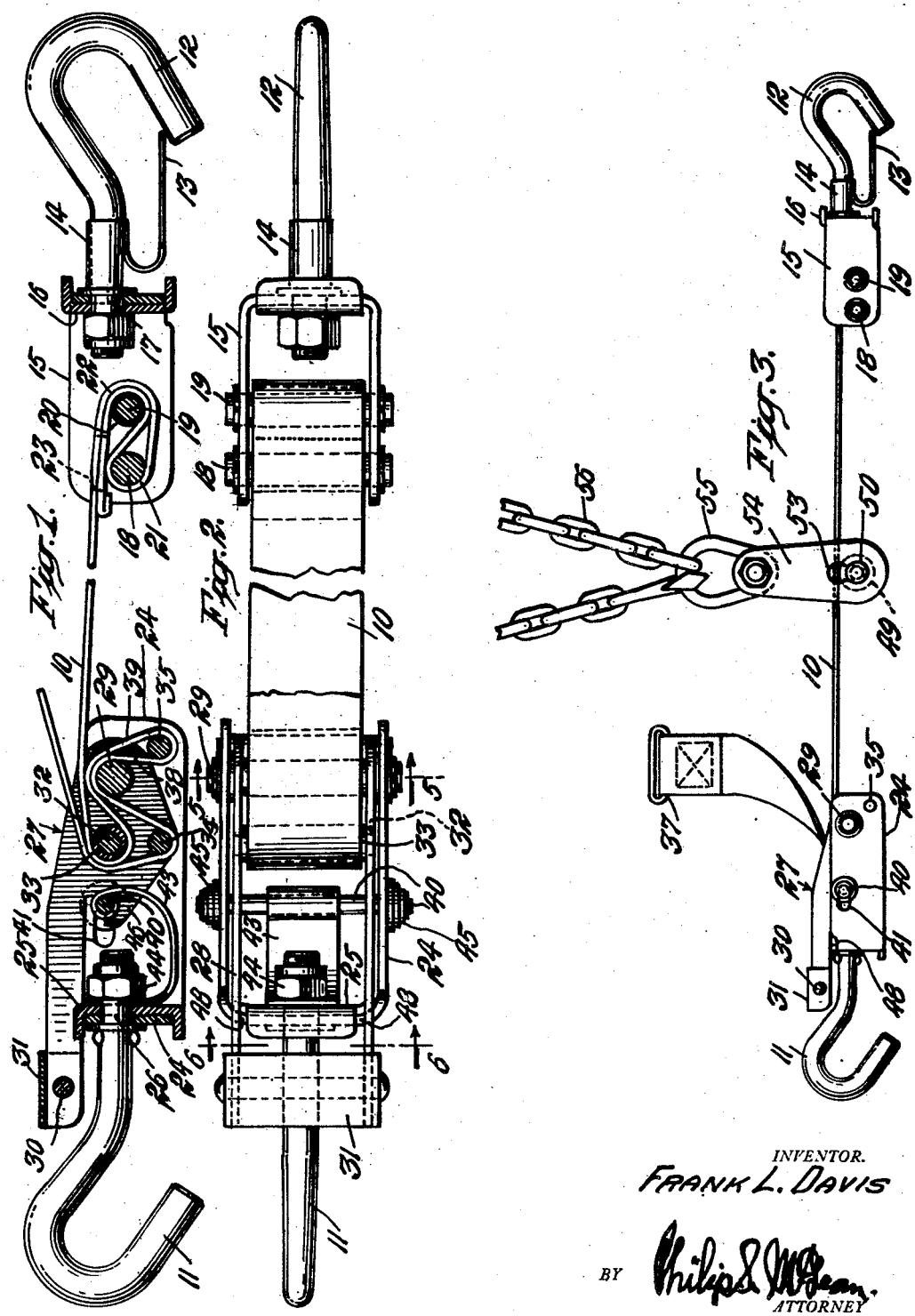

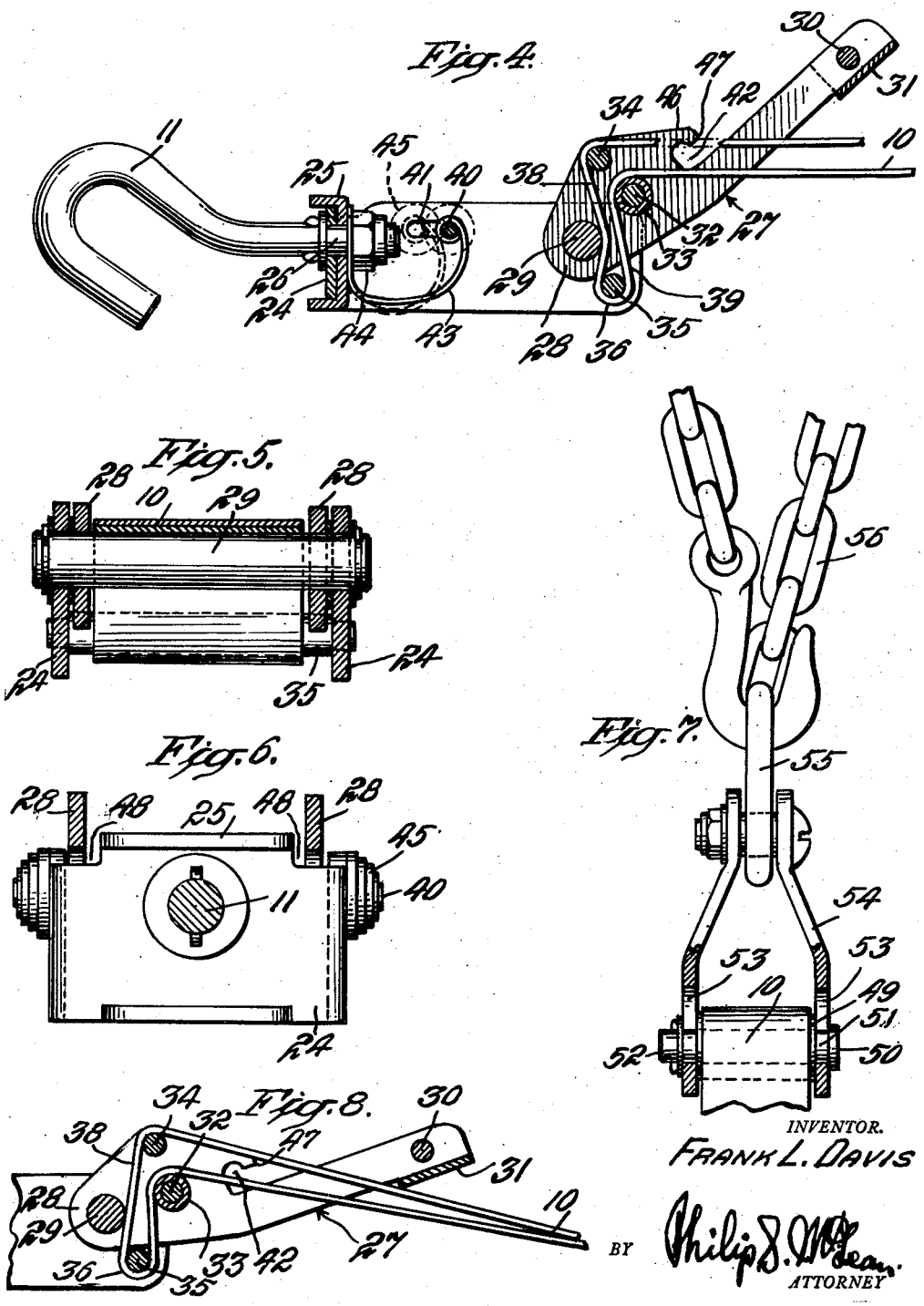

2,710,436

CARGO TIE-DOWN

Frank L. Davis, College Point, N. Y., assignor to Davis Aircraft Products Inc., New York, N. Y., a corporation of New York Application July 20, 1953, Serial No. 368,977

4 Claims. (Cl. 24—68)

The invention herein disclosed relates to tie-down equipment and the general purposes of the invention are to provide simple and practical means by which the strap or webbing for holding cargo may be adjusted first to engage the load and then by an easy, quick action, be tensioned and preloaded in secure holding condition.

Special objects of the invention are to effect automatic locking of the tie-down in its preloaded holding condition and to insure that it will not be accidentally released.

Further special objects of the invention are to provide the tie-down equipment indicated in a form such that any slack, as might result from a shifting load, can be immediately taken up, pretensioned and locked safely in the holding relation.

Other special objects of the invention are to provide such equipment in a light weight form, made up of relatively few parts and otherwise suitable for air transportation purposes.

Other desirable objects attained by the invention and the novel features of construction by which all purposes of the invention are accomplished are set forth and will appear in the course of the following specification.

The drawings accompanying and forming part of the specification illustrate present approved embodiments of the invention but structure may be modified and changed as regards the present illustration, all within the true intent and scope of the invention as hereinafter defined and claimed.

Fig. 1 in the drawings is a broken part sectional view illustrating one of the tie-downs in the tensioned holding condition;

Fig. 2 is a broken plan view of the same;

Fig. 3 is a broken side elevation showing a "rider" connected with the intermediate length of the strap or webbing;

Fig. 4 is a broken longitudinal sectional view showing the strap tensioning toggle lever in the open position permitting slack take-up adjustments of the webbing;

Figs. 5 and 6 are cross sectional views on substantially the planes of lines 5—5 and 6—6 of Fig. 2;

Fig. 7 is a broken cross sectional detail of the rider;

Fig. 8 is a broken sectional detail showing the toggle lever in fully opened relation with the webbing free to be adjusted in both directions.

Figs. 1, 2 and 3 show the holding strap or webbing 10 equipped at opposite ends with hooks 11, 12, designed to be engaged with suitable anchorages on the aircraft or other carrier to which the tie-down is applied.

One of these hooks, 12, is shown as having a spring closure in the form of a spring tongue 13 carried by a sleeve 14 engaged on the shank of the hook, enabling this hook to be snapped into engagement with one anchorage and the webbing then to be extended over the cargo preparatory to connecting the other hook with the other anchorage.

The webbing is shown fastened to the first hook through the medium of a yoke 15 having an intermediate U-plate 16 engaged in the loop of the yoke and in which the shank of the hook is swivelled at 17, said yoke having a cross pin 18 at the end and a cross pin 19 inward from the end carrying a roller 20.

The webbing is shown having a loop 21 engaged about the fixed cross pin 18 and a double loop 22 wrapped about the roller 20 and extending over the single loop 21 away from the end of the yoke. This single and double looping of the webbing about centers 18, 19 and engagement of the double layers 22 over the single layer loop 18 provides ample securing of the webbing, but additionally the end of the webbing is preferably stitched to the body of the webbing, as indicated at 23.

The opposite end of the webbing is adjustably secured through a free acting, slack take-up and pretensioning connection comprising a yoke 24 having a load carrying U-plate 25 within the bend of the same, providing bearing at 26 for the shank of hook 11, and a toggle lever 27 pivoted in this yoke and carrying slack take-up and pretensioning guides for the webbing.

As shown in Figs. 1, 2 and 4, the toggle lever consists of parallel side members 28 pivoted at their inner ends on a rigid pin 29 connecting the sides of the yoke and secured at their outer ends in parallel relation by a pin 30 and handle forming cross bar 31.

The side members 28 of the toggle lever also carry a cross pin 32 with a free roll 33 on it, inward of the pivot forming pin 29, and a rigid pin 34 in triangularly offset relation to the centers of pivot pin 29 and roller pin 32.

A fixed pin 35 is shown secured between the sides of the yoke adjacent the inner end portions of the lever side members 28, in position, as shown in Fig. 4, to limit the open swinging movement of the lever.

This latter view shows how the strap is looped over the roller 32 and is then extended in the form of a loop 36 about stationary pin 35 on the yoke, and thence about pivot pin 29 and around fixed pin 34 on the lever.

Fig. 8 shows how, with the toggle lever in fully opened position, extended away from the hook frame or base, the webbing will be free to be pulled in either direction. The roller 33 on the lever operates as a free running pulley to facilitate passage of the webbing either in the slack take-up direction or in the direction to extend the length of webbing to enable the hook to reach the second anchorage.

After engaging hook 11 with the second anchorage the free end of the strap which for the purpose may carry a suitable handhold such as indicated at 37, Fig. 3, may be pulled back to take out all slack and tighten the webbing over the load.

When the webbing is pulled tight about the cross pins 34 on the lever and 35 on the frame, these will then serve as snubbing pins for keeping the webbing tight while the toggle lever is swung from the extended position shown in Fig. 8, to the closed position shown in Figs. 1 and 3. In this movement the pulley roll will operate with toggle effect to pull and tension the length of webbing between the two hooks as it passes over dead center from the Fig. 8 to the Fig. 1 position. In this movement the snubbing effect exercised by pins 34 and 35 will be increased as in the intermediate portion of this movement the length of webbing 38 between these pins will be arched over the stationary fulcrum pin 29, Fig. 4, and the length of webbing 39 between pin 35 and pulley roll 33 will be wrapped about the loop first laid over the fulcrum pin, Fig. 1. In this final position all three pins 34, 35 and 29 operate with snubbing effect and the stretch of webbing overlying the two loops over the fulcrum pin, Fig. 1, further serves to secure the webbing against any slippage.

The toggle lever is secured in the closed position shown in Figs. 1, 2 and 3, by a cross pin 40 slidingly guided in slots 41 in the sides of the hook frame 24, in position to enter hooked notches 42 in the inner edges of the sides of the toggle lever.

This locking pin is shown engaged by one end of a bowed spring 43 which has its opposite end engaged over the shank of the hook 11 and secured by lock nut 44.

Finger buttons 45 on the ends of the locking pin at the outer sides of the hook frame, provide convenient means for retracting the pin aagainst the tension of spring 43, and inclined cam surfaces 46 on the inner edges of the toggle lever provide means for forcing back the locking pin in the final portion of the closing movement of the toggle lever. As this lever is forced to final position in the hook frame, the spring 43 will snap the locking pin over the hook projections 47 at the ends of slots 42, so that when closing pressure on the toggle lever is removed, pull on the webbing will lift the lever slightly to place the hook projections in holding position in front of the locking pin 40, Fig. 1.

This insures that once the toggle lever is caught it will be held locked in that position, and this further insures that it cannot accidentally be released by retracting the locking pin. Before release the toggle lever must be pressed inwardly sufficiently to carry the locking hook projections 47 inward, clear of pin 40, and then while the toggle lever is so held inward, the locking pin can be retracted by grasping the finger buttons 45 and pulling them outward or toward the hook end of the frame, against the tension of spring 43.

Fig. 6 shows the end of the hook frame or yoke 24 recessed or lowered at opposite sides, at 48, to permit the side members 28 of the toggle lever to have this slight additional inward movement for the locking and unlocking of the same in the hook frame.

Figs. 3 and 7 show how a rider may be applied to the intermediate portion of the webbing to enable connection with a third anchorage and thereby to increase the possible load holding capacity.

This rider is illustrated as a roll 49 engaged in the intermediate stretch of the webbing, carried by a pin 50 annularly grooved at one end, at 51, and having a washer and cotter-pin at the opposite end, at 52, whereby said pin is removably held in keyhole slots 53 in suspension links 54 having shackle and chain connections 55, 56 for engagement with some third intermediate anchorage.

This detachable form of mounting for the rider enables it to be put on at any time, at any point in the intermediate length of webbing to suit loading conditions. By putting on one or more of these riders tensioned in the same or in different directions, the webbing may be led in different directions about special or unusual loads to hold parts against shifting regardless of shape of articles or configuration of the load. These riders may be applied before or after slack take-up and preloading adjustments of the webbing, and readjustments may be made at any time.

These several possibilities enable the tie-down to safely hold particularly heavy loads.

In use generally the snap hook 12 may first be engaged with a floor, side wall or other anchorage abutment and the webbing stretched out over the load and the other hook, 11, connected with an opposing anchorage abutment on the wall, ceiling or floor of the carrier.

In making this second connection the toggle lever may be swung open as in Fig. 8, to permit the second hook being extended to reach the abutment, and after such connection is made the slack can be quickly taken up by simply pulling back on the free end until the webbing is taut. Then, while the free end is held, the toggle lever may be swung over to apply the pretensioning loading. In this action the webbing will be held fast in the loops snubbed about the pins 29 and 35, and in the final position shown in Fig. 1, the toggle lever will be secured in this multiple snubbing position by the safety pin 40. So long as there is tension on the webbing the toggle lever will be locked in this relation by the safety hooks 47, and to let go the toggle lever will have to be first pressed in to clear the ends of these hooks from the pin, and even when thus cleared the finger buttons 45 will have to be pulled back against tension of spring 43 to release the pin from the locking hooks.

The invention thus makes it possible to quickly adjust the webbing over the load and then to tension the webbing so that it will securely hold the load. If the webbing becomes loosened, the toggle lever can be quickly released by pressing it inward and then withdrawing the locking pin, after which any slack can be taken up by pulling on the loose end of the webbing, and following that the toggle lever may be again closed and locked to secure the load under proper holding tension.

While webbing is ordinarily preferred as the holding medium, it will be recognized that other flexible holding material may be employed. The expression, therefore, is to be considered in a generic sense.

The relation of parts shown with the toggle pin 32 and the guide pin 34 in offset triangular relation to the fulcrum pin 29, is preferred, but dimensions may be varied from that illustrated.

It is possible that other variations may be made within the scope of the claims. In all cases localized stress on the webbing is avoided so that this portion may be just as strong as other parts of the apparatus.

The terminal construction shown in Fig. 1, where a loop 21 of the webbing is snubbed about stationary pin 18, and this loop overlaid by double layers of the webbing, takes practically all the load off the stitching which is provided to hold the layers together.

What is claimed is:

1. A take-up and tensioning device for cargo holding webbing, comprising a yoke having parallel sides connected by an arch at one end and open at the opposite end, a hook connected with the arch end of the yoke, a lever having parallel sides disposed between the sides of said yoke, a fulcrum pin secured to the sides of the yoke and pivotally supporting the sides of said lever, a snubbing pin secured between the sides of the yoke, a toggle pin secured between the sides of the lever, a guide pin secured between the sides of the lever in spaced relation to said toggle pin, webbing extending over said toggle pin and about said snubbing pin and past one side of the fulcrum pin and about said guide pin, said lever having pivotal movement from an outwardly extended position at the end of the yoke toward the yoke sufficiently to cause the toggle pin to wrap the length of webbing between the guide pin and snubbing pin about the fulcrum pin and to wrap the length of webbing between the toggle pin and snubbing pin over the webbing wrapped about said fulcrum pin, and releasable means for securing said toggle lever in the position last described.

2. A take-up and tensioning device for cargo holding webbing, comprising a yoke having parallel sides connected by an arch at one end and open at the opposite end, a hook connected with the arch end of the yoke, a lever having parallel sides disposed between the sides of said yoke, a fulcrum pin secured to the sides of the yoke and pivotally supporting the sides of said lever, a snubbing pin secured between the sides of the yoke, a toggle pin secured between the sides of the lever, a guide pin secured between the sides of the lever in spaced relation to said toggle pin, webbing extending over said toggle pin and about said snubbing pin and past one side of the fulcrum pin and about said guide pin, said lever having pivotal movement from an outwardly extended position at the end of the yoke toward the yoke sufficiently to cause the toggle pin to wrap the length of webbing between the guide pin and snubbing pin about the fulcrum pin and to wrap the length of webbing between the toggle pin and snubbing pin over the webbing wrapped about said fulcrum pin, and releasable means for securing said toggle lever in the position last described, including a locking pin disposed transversely of the yoke, the sides of the yoke having slots slidingly guiding said pin toward and away from the toggle lever, the sides of said toggle lever having hook-shaped notches in the edges of the same engageable by said cross pin, and cam surfaces leading to said hook-shaped notches and engageable with said pin, finger buttons on the ends of said pin at the outer sides of the yoke and a spring for thrusting the locking pin toward the toggle lever.

3. A take-up and tensioning device for cargo holding webbing, comprising a frame having parallel sides, a lever having parallel sides disposed between the sides of said frame, a fulcrum pin secured to the sides of the frame and pivotally supporting the sides of said lever, a stationary snubbing pin secured between the sides of the frame, a toggle pin secured between the sides of the lever, a guide pin secured between the sides of the lever in spaced relation to the toggle pin, webbing extending over said toggle pin and about said snubbing pin and past one side of the fulcrum pin and about said guide pin, said lever having pivotal movement on said fulcrum pin from an outwardly extended position at the end of the frame toward the frame sufficiently to cause the toggle pin to wrap the length of webbing between the guide pin and snubbing pin about the fulcrum pin and to wrap the length of webbing between the toggle pin and snubbing pin over the webbing wrapped about said fulcrum pin, said fulcrum pin, guide pin and snubbing pin being disposed substantially as the corners of a triangle and the snubbing pin disposed in the frame closely adjacent the fulcrum pin whereby in the movement of the lever from the extended position to the position between the sides of the frame said guide pin and toggle pin will be caused to travel in arcuate paths away from the snubbing pin about the center of the fulcrum pin.

4. The invention as defined in claim 3, with a loose pulley roller on said toggle pin for facilitating free movement of the webbing about said pins when the lever is in extended position.

References Cited in the file of this patent

UNITED STATES PATENTS 759,305     Nunn _____ May 10, 1904